(12) United States Patent
Kim et al.

(10) Patent No.: US 8,989,732 B2
(45) Date of Patent: Mar. 24, 2015

(54) METHOD AND APPARATUS FOR SETTING COMMUNICATION TARGET IN WIRELESS COMMUNICATION SYSTEM

(71) Applicant: Electronics and Telecommunications Research Institute, Daejeon (KR)

(72) Inventors: Tae Joong Kim, Seongnam-si (KR); Young Hoon Kim, Daejeon (KR); Byung Jae Kwak, Daejeon (KR); Pyeong Jung Song, Daejeon (KR); Seung Chan Bang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 26 days.

(21) Appl. No.: 13/752,643

(22) Filed: Jan. 29, 2013

(65) Prior Publication Data

US 2013/0196652 A1 Aug. 1, 2013

(30) Foreign Application Priority Data

Jan. 30, 2012 (KR) .................. 10-2012-0009044
Sep. 4, 2012 (KR) .................. 10-2012-0097482

(51) Int. Cl.
*H04W 4/00* (2009.01)
*H04W 28/02* (2009.01)
*H04W 56/00* (2009.01)

(52) U.S. Cl.
CPC ........ *H04W 28/0215* (2013.01); *H04W 56/002* (2013.01)
USPC .............. 455/426.1; 455/436; 455/422.1; 370/329

(58) Field of Classification Search
None
See application file for complete search history.

(56) References Cited

U.S. PATENT DOCUMENTS

| | | | |
|---|---|---|---|
| 2003/0185170 A1* | 10/2003 | Allen et al. | 370/329 |
| 2005/0221813 A1* | 10/2005 | Rajahalme et al. | 455/422.1 |
| 2007/0105568 A1 | 5/2007 | Nylander et al. | |
| 2007/0247365 A1 | 10/2007 | Laroia et al. | |
| 2009/0013081 A1 | 1/2009 | Laroia et al. | |
| 2009/0104910 A1* | 4/2009 | Lee et al. | 455/436 |
| 2010/0265990 A1 | 10/2010 | Birru | |

FOREIGN PATENT DOCUMENTS

| | | |
|---|---|---|
| KR | 10-2007-0022937 | 2/2007 |
| KR | 1020080030861 | 4/2008 |

* cited by examiner

*Primary Examiner* — Erika A Wahington
(74) *Attorney, Agent, or Firm* — Nelson Mullins Riley & Scarborough LLP; Anthony A. Laurentano, Esq.; Lewis Lee, Esq.

(57) ABSTRACT

Provided is a method and apparatus for setting a communication target in a wireless communication system. A method of setting, by a setting device, a communication target in a wireless communication system may include: obtaining a synchronization and a characteristic of a target device by receiving a signal transmitted from the target device during a predetermined period of time; transmitting setting information to the target device based on the synchronization and the characteristic of the target device; and completing setting of the communication target by receiving setting response signal from the target device.

18 Claims, 6 Drawing Sheets

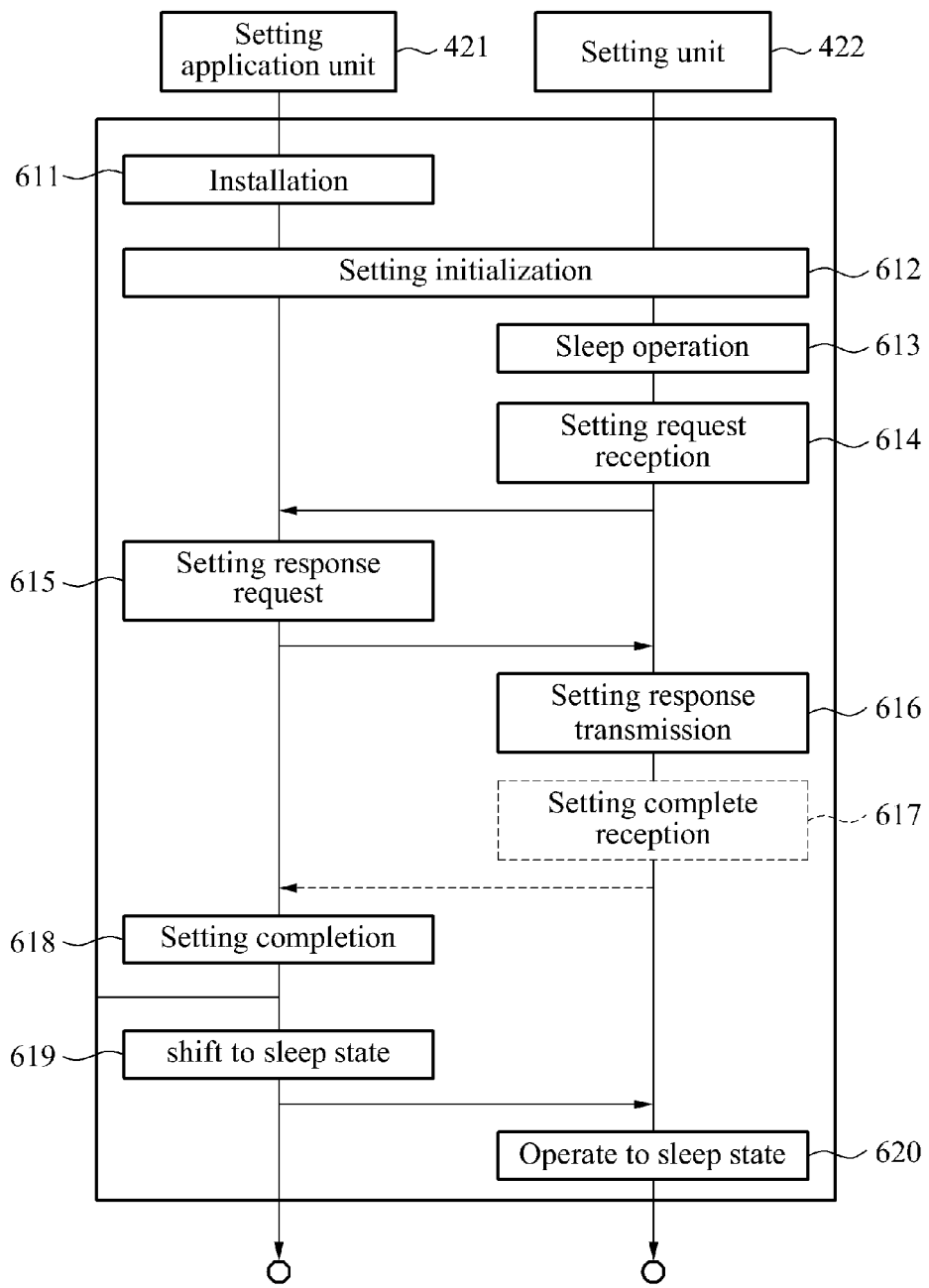

METHOD AND APPARATUS FOR SETTING COMMUNICATION TARGET IN WIRELESS COMMUNICATION SYSTEM

CROSS-REFERENCE TO RELATED APPLICATIONS

This application claims the priority benefit of Korean Patent Application No. 10-2012-0009044, filed on Jan. 30, 2012, and Korean Patent Application No. 10-2012-0097482, filed on Sep. 4, 2012, in the Korean Intellectual Property Office, the disclosures of which are incorporated herein by reference.

BACKGROUND

1. Field of the Invention

The present invention relates to a method and apparatus for setting a communication target in a wireless communication system.

2. Description of the Related Art

For the traffic off-loading coping with a sudden increase in wireless traffic, a variety of approach methods have been provided to cellular mobile communication. As a representative method among the variety of approach methods, a wireless local area network (WLAN) (e.g., Wi-Fi) is in the spotlight.

A WLAN functions can distribute effectively the traffics which are delivered using cellular (wireless) network, to wired network, providing the device with communication link between the device and an access point (AP) connected to the wired network and supporting WLAN. However, the WLAN may still increase traffic load of the wired network.

To solve the above issue, direct communication technology of providing communication within a limited coverage without using a wired network and a cellular network has been gradually expanded and thereby been applied. The direct communication technology may include, for example, Bluetooth performed in a near distance with low power, Wi-Fi peer-to-peer (P2P) technology of providing direct communication while using WLAN technology, and FlashLinQ technology that is available in a farther distance than the WLAN and supports a large number of communication devices. The FlashLinQ technology refers to technology of scanning all of the available devices within, theoretically, 1 km, performing communication at a high-speed rate using a P2P scheme with target device. The FlashLinQ technology refers to technology that is similar to Bluetooth, ad-hoc network technology, and the like, but can make a connection between devices further smooth. When the devices are located each other within theoretically, 1 km, the devices may interact and communicate with each other at a high-speed rate. Accordingly, a file may be transmitted and received at a faster and more stabilized rate, and data and the like may be more flexibly shared.

SUMMARY

An aspect of the present invention provides a method and apparatus for setting a communication target device in a wireless communication system in which a setting device desiring to set a communication target device may obtain a time and a characteristic of a target device by receiving a signal transmitted from the target device, and may set the communication target device based on the obtained time and characteristic.

An aspect of the present invention also provides a method and apparatus for setting a communication target device in a wireless communication system in which a target device may maintain a sleep state and shift to a normal state to form a communication link, according to a received signal at a predetermined time, thereby effectively decreasing an amount of power used by the target device.

According to an aspect, there is provided a method of setting, by a setting device, a communication target device in a wireless communication system, the method including: obtaining a synchronization and a characteristic of a target device by receiving a signal transmitted from the target device during a predetermined period of time; transmitting setting information to the target device based on the synchronization and the characteristic of the target device; and completing setting of the communication target device by receiving setting response signal from the target device.

According to another aspect of the present invention, there is provided an apparatus for setting a communication target device in a wireless communication system, the apparatus including: a setting application unit to command setting a communication target device and to transfer the result of setting a communication target device to an outside; and a setting unit to discover a target device and set the communication target device using the command received from the setting application unit, and to transfer the result of setting a communication target device to the setting application unit.

According to still another aspect of the present invention, there is provided an apparatus for setting a communication target device in a wireless communication system, the apparatus including: a setting application unit to receive a request for a communication target device from a setting device, and to transfer the result of the request for communication target device to an outside; and a setting unit to transfer a setting request signal reception result to the setting application unit, and to transmit the setting response signal received from the setting application unit, to the setting device.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 6 is a diagram illustrating a procedure for setting a communication target device performed in a target device according to an embodiment of the present invention.

DETAILED DESCRIPTION

Figure 1:
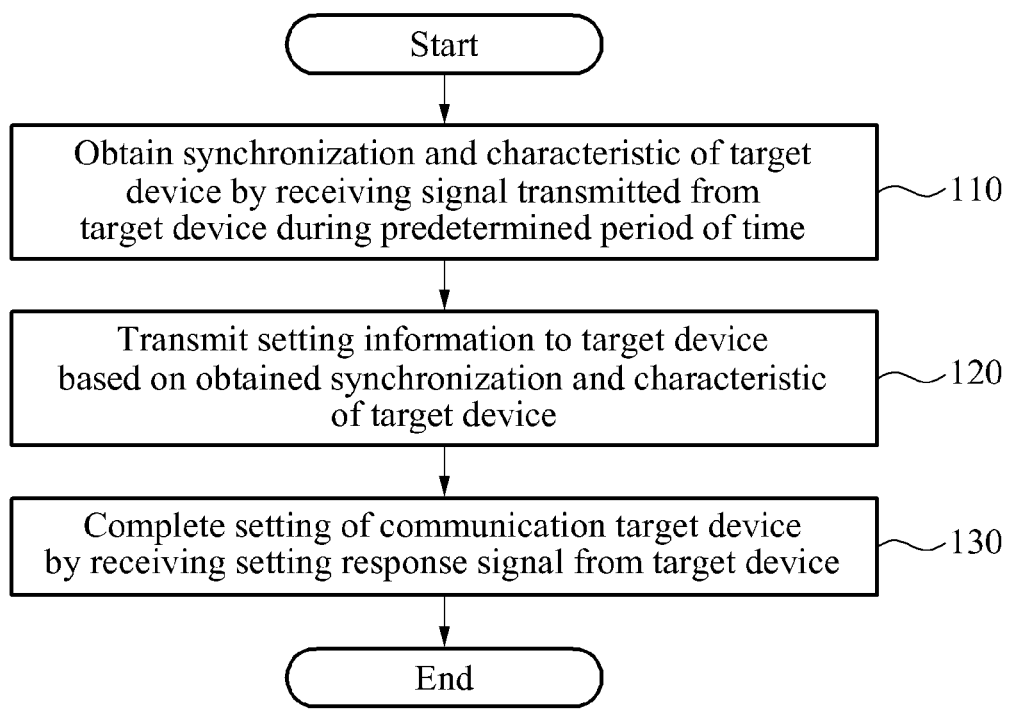
FIG. 1 is a flowchart illustrating a method of setting, by a setting device, a communication target device in a wireless communication system according to an embodiment of the present invention.

According to a procedure of setting a communication target between devices using Wi-Fi peer-to-peer (P2P) technology that is a conventional inter-device communication scheme, a Wi-Fi P2P devices is activated for a relatively large amount of time and thus, an amount of power used by the Wi-Fi P2P devices may also increase. In addition, due to state collision between Wi-Fi P2P devices, an idle time in which no operation is performed may occur. Also, since a communication target is set in a state in which link quality is relatively degraded, efficiency may be decreased.

Also, according to a procedure of setting a communication target between devices using FlashLinQ technology that is a conventional inter-device communication scheme, all of FlashLinQ devices need to secure the same period of time. Accordingly, separate hardware and software for receiving an external signal and maintaining synchronization may need to continuously operate. When the above communication target setting procedure is applied in a disallowed frequency band, effect of the communication target setting procedure may not be achieved.

Accordingly, there is a need for a method and apparatus that may decrease an amount of time used for a procedure of recognizing a communication apparatus between devices and may also significantly decrease an amount of power used by providing an effective operation scheme of the communication target setting procedure with respect to the inter-device communication scheme.

Hereinafter, reference will now be made in detail to exemplary embodiments of the present invention, examples of which are illustrated in the accompanying drawings. However, the present invention may be modified in a variety of exemplary embodiments and are not limited to the exemplary embodiment described herein. In the drawings, a portion irrelevant to the description is omitted for clarity and ease of description and like reference numerals refer to like elements throughout the specification.

Also, when a predetermined portion is described to "comprise/include" a predetermined constituent element, it may indicate that the predetermined portion may further include another constituent element, instead of excluding the other constituent element, unless differently described.

FIG. 1 is a flowchart illustrating a method of setting, by a setting device, a communication target device in a wireless communication system according to an embodiment of the present invention.

The method of setting a communication target device in a wireless communication system according to the present invention includes operation 110 of receiving, by a device (hereinafter, a setting device) desiring to set the communication target device, a synchronization signal from a target device to thereby obtain synchronization and a characteristic of the target device, operation 120 of transmitting a signal including information associated with the setting device and/or setting information to the target device based on the obtained synchronization signal of the target device, and operation 130 of completing the procedure of setting the communication target device by receiving response information from the target device. Using an application program, a user interruption, and the like, the setting device may terminate a sleep state and may perform an operation for setting a communication target.

In the wireless communication system in which synchronization between devices is not guaranteed, in operation 110, the setting device may be unaware of when the target device transmits a synchronization signal and thus, may need to obtain the synchronization by receiving a signal during at least one cycle in which the target device transmits the synchronization signal. In the wireless communication system in which the synchronization between devices is guaranteed, in operation 110, the setting device may be aware of when the target device transmits the synchronization signal and thus, may obtain the synchronization by receiving a signal during only a period in which the target device transmits the synchronization signal.

A characteristic of a communication target candidate to be obtained in operation 110 may be classified based on the characteristics of target device and/or a characteristic of a service provided by the target device. Accordingly, when the setting device tries to obtain the characteristic of the communication target candidate in operation 110, the target device may need to transmit a synchronization signal based on the characteristic of the target device. When the setting device knows in advance the characteristic of the target device desired to be set and/or the characteristic of the service provided by the target device, the setting device may obtain the synchronization and the characteristic of the target device using only the synchronization signals corresponding to the characteristic of the target device in operation 110.

In operation 120, the setting device may transmit a signal at a suitable time considering the time when the target device performs a reception operation in sleep state. In the wireless communication system in which the synchronization between devices is not guaranteed, the setting device may determine the transmission timing based on the synchronization signal obtained in operation 110. On the other hand, in the wireless communication system in which synchronization between devices is guaranteed, the setting device may determine the transmission timing based on a predetermined time at which the target device is supposed to perform the reception operation.

Meanwhile, in operation 120, the setting device may selectively transmit a setting request signal including information associated with the setting device and/or setting information based on the characteristic of the communication target candidate device obtained in operation 110. For example, when the characteristic of the target device desired to be set by the setting device matches the characteristic of the communication target candidate device obtained in operation 110, the setting device may transmit the setting request signal. Also when the characteristic of the service desired to be performed by the setting device matches a characteristic of a service provided by the target device candidate device obtained in operation 110, the setting device may transmit the setting request signal. On the contrary, when the characteristic of the target device desired to be set by the setting device does not match the characteristic of the communication target candidate device obtained in operation 110, the setting device may not transmit the setting request signal. Also when the characteristic of the service desired to be performed by the setting device does not match a characteristic of a service provided by the target device candidate device obtained in operation 110, the setting device may not transmit the setting request signal.

The setting request signal transmitted in operation 120 may be configured in a plurality of forms. As one example, the setting request signal included in the setting request signal may be transmitted when the target device performs the reception operation. In this example, the target device may detect the setting request signal at a corresponding time.

As another example, the setting request signal may include an indicator indicating whether the setting request message is transmitted and setting request message. The "setting request signal" indicator may be transmitted when the target device performs the reception operation. Next, the setting request signal message may be transmitted at a designated point in time. Through this, the presence of the setting request message may be quickly verified by detecting only the "setting request signal" indicator and thus, it is possible to further decrease a consumption of power used by the target device in the sleep state.

Here, the "setting request signal" indicator may have an "A" signal when the setting request message is present, while the "setting request signal" indicator may have an "−A" signal when the setting request message is absent. This structure of the "setting request signal" indicator is called as antipodal structure. Also, the "setting request signal" indicator may have an "A" signal when the setting request message is present, while the "setting request signal" indicator may have an "0" signal when the setting request message is absent. "0" signal indicates that any signal is not transmitted. Also, it is possible to use 3-level structure for the "setting request signal" indicator. For this structure, the "setting request signal" indicator has "A", "−A" and "0" for the presence of setting request message, for the absence of setting request message due to some reasons even though synchronization, and for failure of synchronization, respectively.

The "setting request signal" indicator may use a signal, for example, A1 selected from among different signals A1, A2, . . . , Ak, based on the characteristics of the communication target candidate devices obtained in operation 110. For example, the "setting request signal" indicator may be selected based on the synchronization signal obtained in operation 110. Also, the "setting request signal" indicator may use a signal, for example, B1 selected from among different signals B1, B2, . . . , Bk, based on the characteristic of the setting device or the characteristic of the service desired to be performed by the setting device.

The different signals may include signals having orthogonality. In operation 130, when information associated with the target device matching a setting information transmitted in operation 120 is received, the setting device may complete setting of the communication target device. Next, through a separate procedure, actual communication may be performed between setting device and the communication target device.

The setting device may transmit, to the target device, a setting complete signal indicating that setting of the communication target is completed in operation 130. The setting complete signal may be transmitted to inform the target device that setting is completed and thus, the communication target device needs to prepare to perform actual communication and to terminate a communication target setting procedure.

According to another embodiment of the present invention, a method of setting a communication link between devices in a wireless communication system may include a sleep operation in which a target device repeats a transmission, a reception, and a sleep every predetermined interval, and a setting response operation in which the target device transmits information associated with the target device to a setting device desiring to set a communication target device.

The sleep operation may include repetition of a sleep period with a predetermined length. One sleep period may include a transmission section, a reception section, and a sleep section. In the transmission section, the target device may transmit a synchronization signal such that the setting device can verify whether the target device is present around the setting device, and obtain synchronization and a characteristic thereof. The reception section may be a period for receiving a setting request signal when the setting device transmits the signal including a setting request message to the target device. The transmission section may be ahead of the reception section or behind the reception section, but to be adjacent to the reception section.

The target device may use only one synchronization signal as a synchronization signal to be transmitted in the transmission section. Even though a single synchronization signal is used, target devices may be differentiated by transmission time with a sufficient probability in the wireless communication system in which synchronization between devices is not guaranteed. Also the target device may select and use one of a plurality of synchronization signals as a synchronization signal to be transmitted in the transmission section based on a predetermined rule. This is to prevent collision that may occur in the case of using a single synchronization signal in the wireless communication system in which synchronization between devices is guaranteed.

As a synchronization signal to be transmitted in the transmission section, the target device may select one of the plurality of synchronization signals based on the characteristic of the target device and/or the characteristic of the service provided by the target device.

The target device may receive the setting request signal in the reception section. Since the setting device transmits a setting request signal at the aligned time to the reception section of the target device, the target device may receive the signal at the reception section without changing the timing.

A method of receiving a setting request signal by the target device may vary based on a form of the setting request signal.

As one example, when a separate "setting request signal" indicator is absent, the target device may receive the setting request signal in the reception section, and extract information through a demodulation and decoding process. Here, when an error is verified, for example, by a CRC detection result, a subsequent section, the transmission section or the sleep section may be continued. On the other hand, when an error-free is verified, for example, by a CRC detection result, and when the contents of the message included in the setting request signal does not match the characteristic of the target device and its service characteristic, a subsequent section, for example, the transmission section or the sleep section, of the sleep operation may be continued. When the content of the message included in the setting request signal is match the characteristic of the target device and its service characteristic, the sleep operation may be terminated and the setting response operation may be performed.

As another example, when the setting request signal includes a "setting request signal" indicator and setting request message, the "setting request signal" indicator may be detected by the target device. Here, when the target device detect "setting request signal" indicator as including setting request message, the target device may receive the part of setting request message and to extract information through a demodulation and decoding process. When an error is verified, for example, by a CRC detection result, a subsequent section, the transmission section or the sleep section may be continued. On the other hand, when an error-free is verified, for example, by a CRC detection result, and when the contents of the message included in the setting request signal does not match the characteristic of the target device and its service characteristic, a subsequent section, for example, the transmission section or the sleep section, of the sleep operation may be continued. When the content of the message included in the setting request signal is match the characteristic of the target device and its service characteristic, the sleep operation may be terminated and the setting response operation may be performed. Here, when the target device detect "setting request signal" indicator as not including setting request message, the subsequent section, for example, the transmission section or the sleep section may be continued without performing the demodulation and decoding process.

Based on the content of the message included in the setting request signal, only the target device matching setting request message may transmit a setting response signal in the setting response operation. The setting response signal may include information associated with the target device and information associated with the setting device, which is obtained from the received setting request signal.

As described above, when the setting device transmits a setting complete signal to the target device in order to complete setting of the communication target device, the target device may receive the setting complete signal and may shift to the sleep state. When separate setting complete signal is absent, the target device may shift to the sleep state after a predetermined period of time is elapsed ($T \geq 0$) after transmitting the setting response signal.

Figure 2:
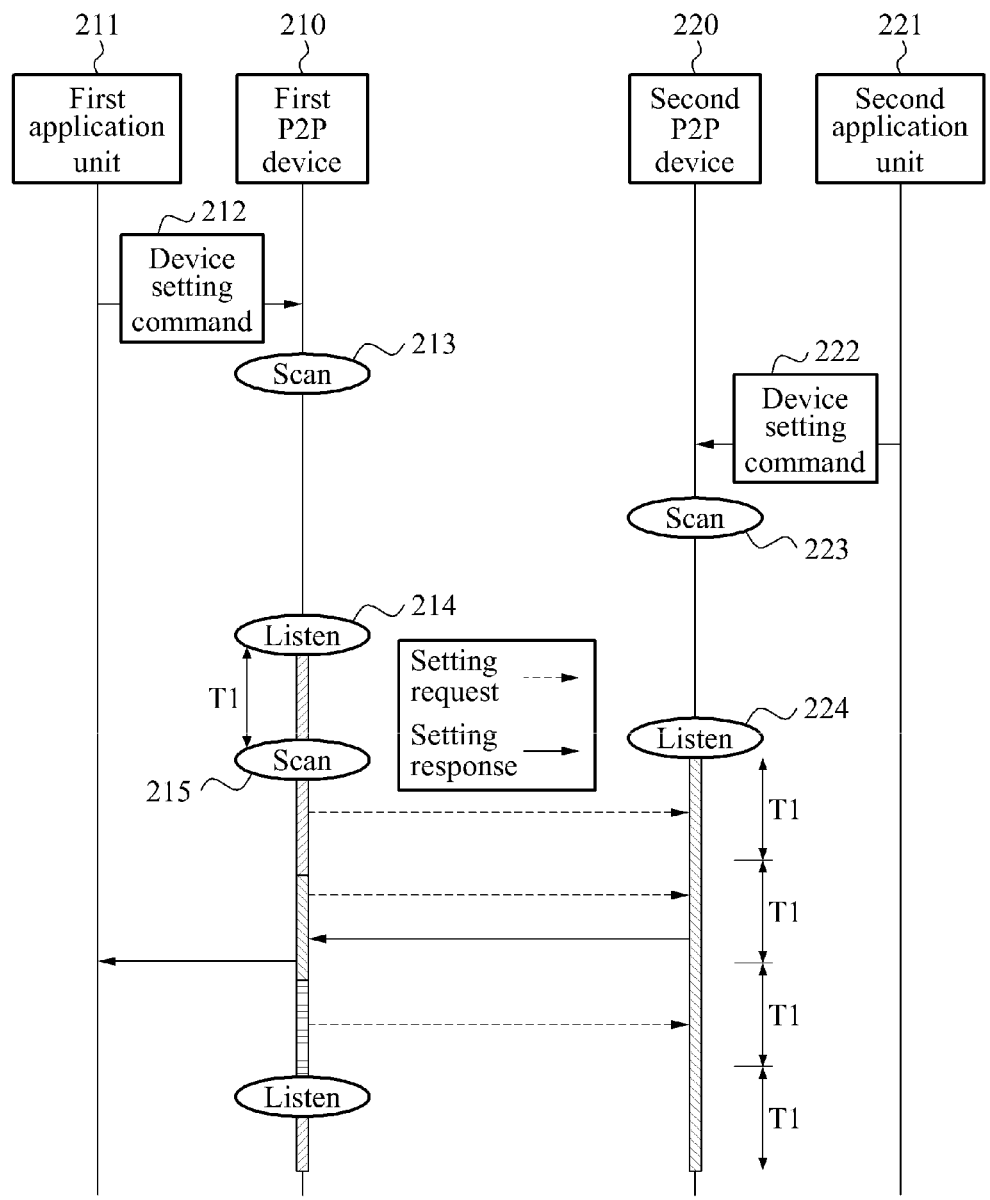
FIG. 2 is a diagram illustrating a device discovery operation using Wi-Fi peer-to-peer (P2P) technology.

FIG. 2 is a diagram illustrating a device discovery operation using Wi-Fi peer-to-peer (P2P) technology.

Hereinafter, a procedure for setting a communication apparatus between devices according to a Wi-Fi P2P standard that is a conventional communication scheme between devices will be described.

A first P2P device 210 may be activated by a first application unit 211 including station management entity (SME), application, user, vender, and the like, corresponding to the first P2P device 210. The above activation may be performed in response to a device setting command in operation 212. When the device setting command is received, the first P2P device 210 may shift to a scanning state and may scan all of the frequency channels in operation 213. It is assumed in FIG. 2 that CH1, CH6, and CH11 are retrieved as frequency channels in the scanning state.

Similar to the first P2P device 210, a second P2P device 220 may be activated by a second application unit 221 including SME, application, user, vender, and the like, corresponding to the second P2P device 220. Similar to the first P2P device 210, in a subsequent process, the above activation may be performed in response to a device setting command in operation 222. When the device setting command is received, the second P2P device 220 may shift to a scanning state and may scan all of the frequency channels in operation 223. It is assumed in FIG. 2 that CH1 is retrieved as a frequency channel.

The first P2P device 210 may complete a frequency channel scanning in the scanning state in operation 213 and may shift to a listening state in operation 214. In the listening state, an operation of listening whether a setting request signal is received from a neighbor device may be performed. An amount of time for the listening state may be determined using a predetermined period of time T1 that is randomly selected. For example, when the frequency channel scanning is completed in the scanning state in operation 213, a setting request signal may be preferentially listened during the predetermined period of time T1 that is randomly selected.

The second P2P device 220 that has completed the frequency channel scanning in the scanning state in operation 223 may also shift to the listening state in operation 224 and may perform an operation of listening whether a setting request signal is received from a neighbor device.

When the first P2P device 210 does not receive the setting request signal in the listening state 214 in operation 214, the first P2P device 210 may shift to a scanning state in operation 215. In the scanning state, the first P2P device 210 may transmit a setting request signal for each of the frequency channels obtained in operation 213. The first P2P device 210 may transmit the setting request signal with respect to each of the frequency channels CH1, CH6, and CH11 obtained in operation 213, and may perform an operation of verifying whether a setting response signal is received from another neighboring P2P device. Here, the second P2P device 220 remains in the listening state using CH6 and thus, may receive the setting request signal transmitted from the first P2P device 210. In response thereto, the second P2P device 220 may transmit a setting response signal to the first P2P device 210.

The first P2P device 210 may transmit a setting request signal with respect to all of the frequency channels obtained in operation 213, and may verify whether a setting response signal is received in response to the setting request signal. It is assumed in FIG. 2 that only the second P2P device 220 transmits a setting response signal using CH6.

Through the above procedure, the first application unit 211 of the first P2P device 210 may discover another P2P device that is present around the first P2P device 210 and thereby set a communication target device.

However, in the above communication target device setting procedure of the Wi-Fi P2P device, a target Wi-Fi P2P device as well as a Wi-Fi P2P device desiring to set the communication target device may need to be in an activated state. Accordingly, a Wi-Fi P2P device may become the communication target device at any time and thus, need to be activated to use the above scheme regardless of being set as the communication target device. Accordingly, it may be significantly inefficient in saving an amount of power.

Also, in the above communication target device setting procedure of the Wi-Fi P2P device, a Wi-Fi P2P device desiring to set a communication target device may need to shift among the scanning state, the listening state, and the searching state. Here, a length of a listening state section may be randomly selected and thus, a state collision may occur with other neighboring P2P devices. For example, when the first P2P device 210 and the second P2P device 220 are in the listening state in operations 214 and 224, respectively, no operation may be performed by the devices and the time may elapse wastefully for setting the communication target device. Also, when the first P2P device 212 and the second P2P device 220 are simultaneously in the searching state in operation 215, a setting response signal may not be transmitted even though the setting request signal is received. Accordingly, the time required for setting the communication target device may increase wastefully.

Also, in the above communication target device setting procedure of the Wi-Fi P2P device, time synchronization may not be obtained and gain control may not be performed. Accordingly, a setting request signal and a setting response signal may need to be received in a state in which link quality is relatively degraded. Accordingly, in the case of using the above communication target device setting procedure of the Wi-Fi P2P device, a required time length and/or frequency width of a signal may increase in order to enhance the link quality. Accordingly, transmission efficiency may decrease.

When decreasing the time length and/or frequency width of signal in order to maintain the transmission efficiency, the available coverage for communication target device setting may be reduced due to degradation in the link quality.

Figure 3:
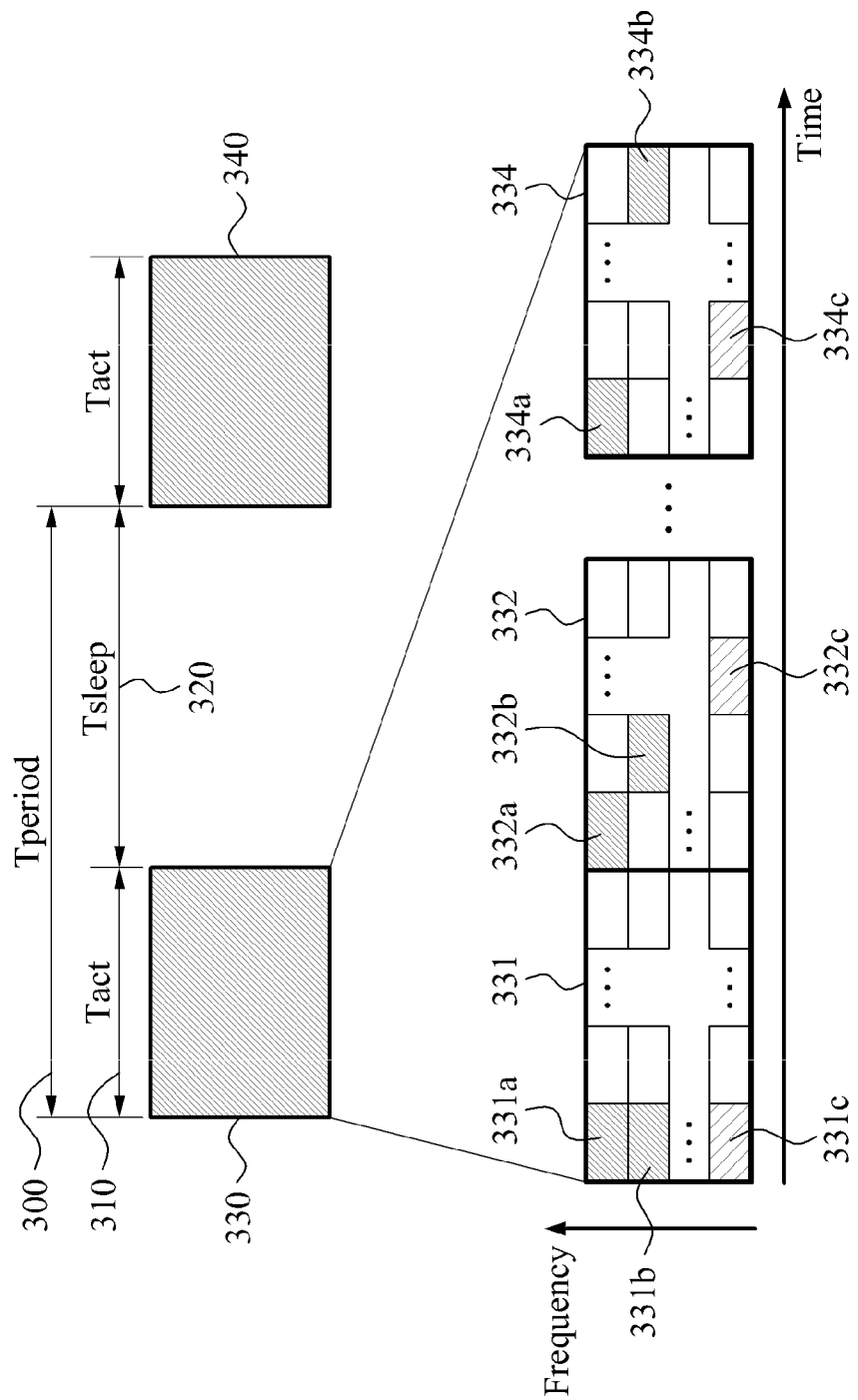
FIG. 3 is a diagram to describe a configuration of a signal for device discovery based on FlashLinQ technology.

To solve the above issue, proposed is FlashLinQ technology that may minimize an amount of power used by a target device and may also significantly decrease an amount of time required for setting a communication target device. FIG. 3 illustrates a signal system for device discovery based on the FlashLinQ technology. Hereinafter, a procedure for setting a communication apparatus between devices according to the FlashLinQ technology that is a conventional communication scheme between devices will be described with respect to FIG. 3.

All of the devices supporting the FlashLinQ standard technology are to use the same synchronization signal. The devices may share an activation section using the same timing (synchronization).

Referring to FIG. 3, a first synchronization signal 330 is assigned to a first a synchronization signal activation section 310, and a second synchronization signal 340 maintains a predetermined interval with the first synchronization signal 330. Accordingly, the length of one synchronization signal is $T_{period}$ 300, and may include a synchronization signal activation section 310 ($T_{act}$) in which a synchronization signal is actually transmitted and a synchronization signal inactivation section 320 ($T_{sleep}$) in which a device maintains a sleep state.

The synchronization signal activation section 310 may also be divided into small sections on a time axis, and each small section may be additionally divided into a plurality of transmission units on the time axis and a frequency axis. Here, one transmission unit may include a time within a small section and a frequency within a small section.

Accordingly, a group of transmission units may be assigned to a single device, positioning one transmission unit to each small section. As described above, a single sequence of transmission units may be assigned to a single device, and the device may transmit a synchronization signal in a corresponding single sequence of transmission units. For example, it is possible to identify a device based on a sequence of transmission units for a synchronization signal transmitted by the device. For example, a sequence of transmission units 331a, 332a, . . . , 334a may be assigned to a first device, and a sequence of transmission units 331b, 332b, . . . , 334b may be assigned to a predetermined second device, and a sequence of transmission units 331c, 332c, . . . , 334c may be assigned to a predetermined third device.

Accordingly, all of the devices providing FlashLinQ may transmit a synchronization signal in an assigned sequence of transmission units through a radio frequency (RF) and other required operations in the synchronization signal activation section 310, and may maintain a sleep state in the synchronization signal inactivation section 320, thereby decreasing an amount of power consumption.

A device desiring to set a communication target device may receive all of the signals through an RF and other required operations in the synchronization signal activation section 310, and may detect a synchronization signal of another FlashLinQ device. Through this, the device may verify an identification (ID) number of the other FlashLinQ device. The verified ID number may be used as a result of setting the communication target device.

The device desiring to set the communication target device may receive all of the signals in the synchronization signal activation section 310 and may verify the presence and an ID number of the first device by accumulating the received signals in the sequence of transmission units 331a, 332a, . . . , 334a, may verify the presence and an ID number of the second device by accumulating the received signals in the sequence of the transmission units 331b, 332b, . . . , 334b, and may verify the presence and an ID number of the third device by accumulating the received signals in the sequence of the transmission units 331c, 332c, . . . , 334c.

As described above, for the above communication device discovery procedure between devices according to FlashLinQ technology, all devices should have an identical timing of the synchronization signal activation section 310 by securing the same timing.

To maintain such synchronization, there is a need to maintain the synchronization by continuously receiving an absolute synchronization signal from an outside, for example, a global positioning system (GPS) or a base station signal of a cellular communication system in which synchronization between base stations is maintained. Accordingly, separate hardware and software may need to continuously operate in order to receive an external signal and thereby maintain synchronization. Accordingly, the additional operation may require the more amount of power consumption increment than the amount of power consumption reduction by applying the synchronization signal activation section 310 and the synchronization signal inactivation section 320

Also, when a signal excluding a FlashLinQ synchronization signal is input in the synchronization signal activation section 310, an error may occur while detecting a synchronization signal in the communication device discovery procedure according to the FlashLinQ, thus an error may occur in detecting the neighboring devices Accordingly, a licensed frequency band may need to be used in the FlashLinQ technology, which may cause crucially defect as technology for performing direct communication between devices.

Even though the setting communication target device technology adopted by FlashLinQ may be applied to an unlicensed frequency band, synchronization signal detection alone may be insufficient in the unlicensed frequency band for setting communication target device. Accordingly, to set the communication target device without an error, an additional signal may need to be transmitted and received, which may result in losing advantages of FlashLinQ obtained when being used in the licensed frequency band.

Figure 4:
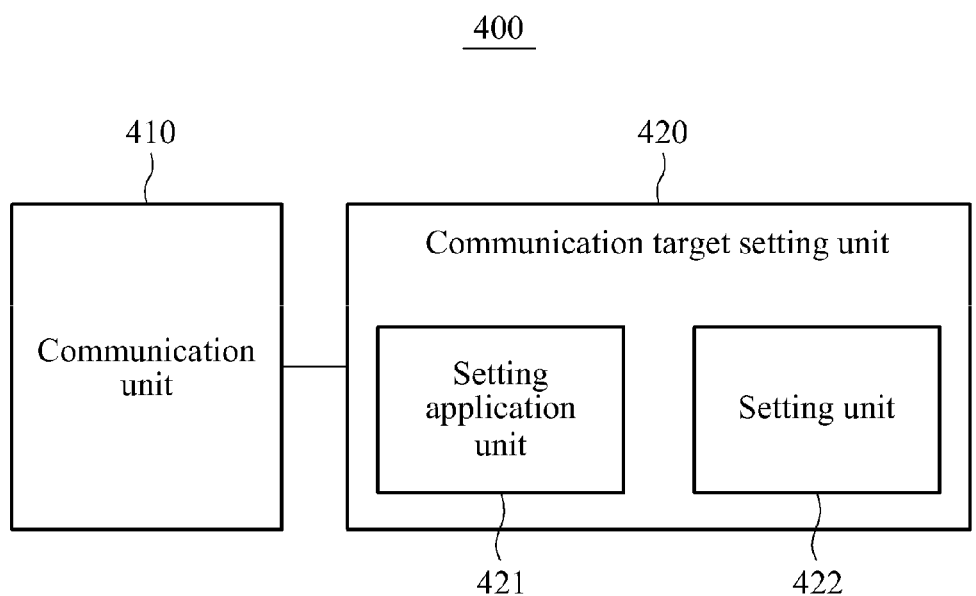
FIG. 4 is a block diagram illustrating a configuration of a setting device and a target device according to an embodiment of the present invention.

FIG. 4 is a block diagram illustrating a configuration of a setting device 400 and a target device according to an embodiment of the present invention.

Referring to FIG. 4, the setting device 400 may include a communication target setting unit 420 to set a communication target device and a communication unit 410 to communicate with an actual target device. The communication target setting unit 420 may include a setting application unit 421 to command a setting communication target device and to transfer a result of the setting communication target device of the to an outside, and a setting unit 422 to discover a target device in response to the command of a setting communication target device received from the setting application unit 421, to set the target device as the communication target device, and to transfer the result of the setting communication target device to the setting application unit 421.

A configuration of the target device may be configured to be identical to the configuration of the setting device 400, and may include the communication target setting unit 420 to set a communication target device and the communication unit 410 to communicate with the actual setting device 400. The communication target setting unit 420 may include the setting application unit 421 to receive a communication target setting request from the setting device 400, and to transfer a result of the setting communication target device to an outside, and the setting unit 422 to transfer a result of a communication target setting request reception to the setting application unit 421, and to receive, from the setting application unit 421, a setting response for transmitting a setting response signal.

Figure 5:
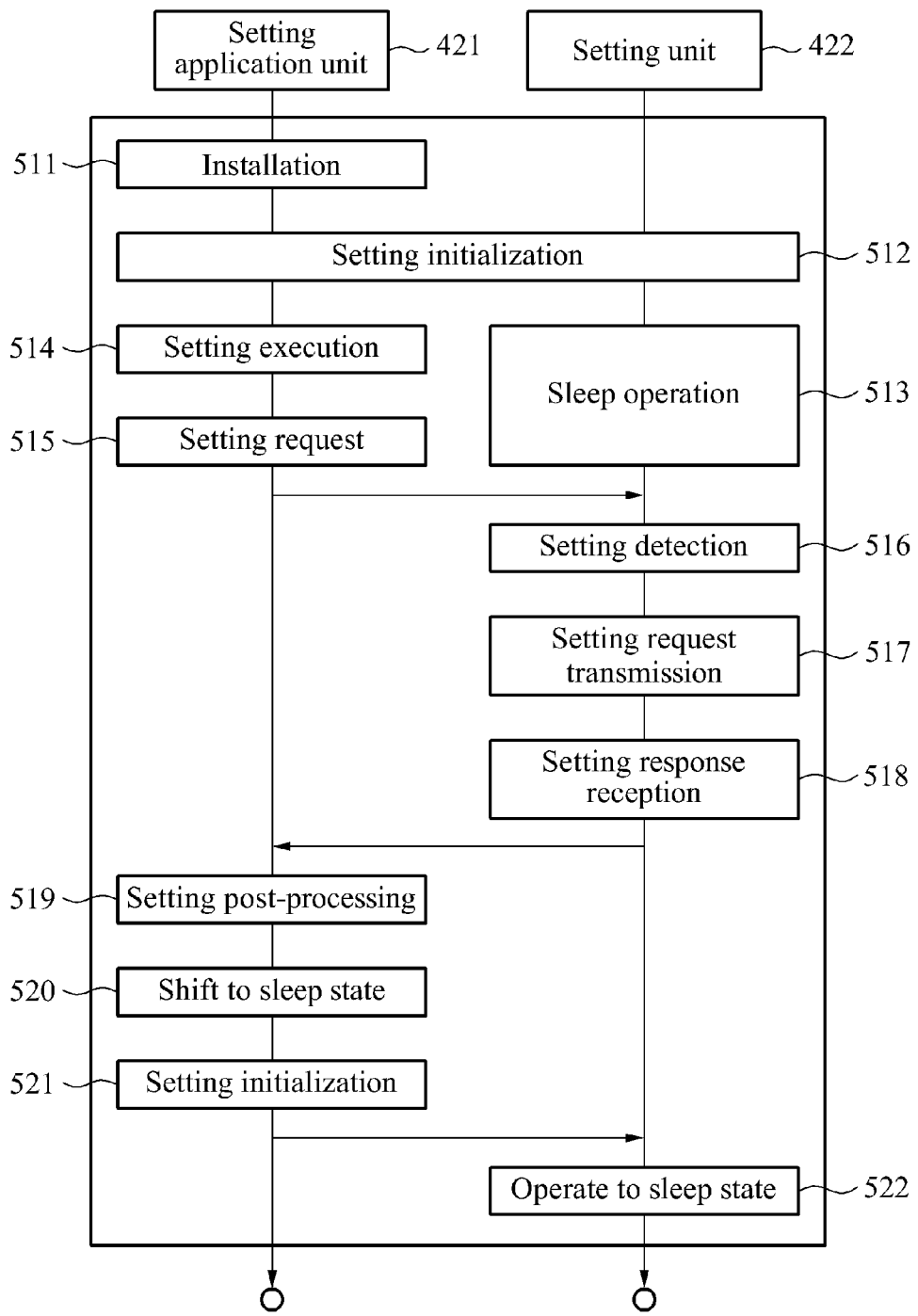
FIG. 5 is a diagram illustrating a procedure for setting a communication target device performed in a setting device according to an embodiment of the present invention.

FIG. 5 is a diagram illustrating a procedure for setting communication target device performed in a setting device according to an embodiment of the present invention. Hereinafter, an apparatus and method for setting a communication target device performed in a setting device will be further described with reference to FIG. 5.

The setting application unit 421 may be generated by installing an application program that includes a communication target setting function in operation 511, and may perform an overall initialization function for the communication target setting unit 420 in operation 512.

For example, the setting application unit 421 may activate an interrupt to make it possible to receive the interrupt from the setting unit 422, and may transfer the parameters to the setting unit 422 to make it possible to initialize the setting unit 422. Through this, the setting application unit 421 and the setting unit 422 may perform an initialization process for communication target setting procedure. For example, the initialized setting unit 422 may perform a sleep operation in operation 513.

The setting unit 422 may perform a transmission operation, a reception operation, and a sleep operation at predetermined intervals in operation 513. Here, the transmission operation and the reception operation may be minimally performed in order to decrease an amount of power consumed by the target device. The transmission operation and the reception operation may need to be adjacent to each other.

For the transmission operation in operation 513, the setting unit 422 may select a synchronization signal based on a characteristic of the device 400 and a characteristic of a service provided by the device 400. For example, a device providing a printing service may select a synchronization signal corresponding to the printing service and thereby transmit the selected synchronization signal. Also, when a plurality of synchronization signals is available by devices providing the printing service, a synchronization signal may be randomly selected from among the plurality of synchronization signals and thereby be used for transmission.

The setting application unit 421 may receive a communication target setting request from a user, and may execute setting of the communication target device in operation 514. The setting application unit 421 may prepare an operation required to set the communication target device. For example, to set a communication link, the setting application unit 421 may determine a characteristic of a device, a type of a service to perform, and the like, and may prepare to transfer the determined characteristic of the device and type of service to the setting unit 422, and/or may execute an application program required to set the communication target device.

Next, in operation 515, the setting application unit 421 may request the setting unit 422 to set the communication target device. In operation 515, the setting application unit 421 may transfer the characteristic of the device, the type of the service, and the like to the setting unit 422.

In response to the request from the setting application unit 421, the setting unit 422 may detect a synchronization signal transmitted from neighbor devices, in order to set the communication target device in operation 516. Operation 516 is to obtain the synchronization and thus, the setting unit 422 may obtain synchronization and a characteristic of the target device by receiving a signal transmitted from the target device during a predetermined period of time.

When the target device in the sleep operation selects a single synchronization signal among a plurality of synchronization signals and transmits the selected synchronization signal, the setting device may try to detect all the available synchronization signals in operation 516. Based on the characteristic of the device and the type of the service received in operation 515, only a predetermined synchronization signal may be selected and be used to the detection process.

When synchronization signals of neighboring target devices are detected in operation 516, the setting unit 422 may transmit a setting request signal to the neighboring target devices in operation 517.

When synchronization signals transmitted from a plurality of devices are detected in operation 516, a setting request signal may be transmitted at a timing point based on the timing of a detected synchronization signal in operation 517. After waiting for a response thereto, another setting request signal may be transmitted at a timing point based on the timing of another detected synchronization signal. Also, after waiting for a response thereto, another setting request signal may be transmitted. Accordingly, setting request signals may be sequentially transmitted.

Also, when synchronization signals transmitted from a plurality of devices are detected in operation 516, setting request signals may be transmitted at the respective timing points based on the timing of the detected synchronization signals and the setting responses thereto may be waited. The above parallel scheme of transmitting setting request signals and waiting for the setting responses thereto may significantly decrease an amount of time required to set the communication target device. However, since transmission of the setting request and reception of the setting response may be performed simultaneously, the setting unit 422 may need to be configured to simultaneously perform the above transmission and reception. Accordingly, a collision may occur between the setting response signals. The sequential or parallel performing transmission of the setting request and reception of the setting response may be configured to achieve the optimal performance based on a communication target device setting environment.

When the setting request signal is transmitted in operation 517, operation 518 may be performed. In operation 518, a setting response signal(s) may be received from neighboring target devices that receive the transmitted setting request signal in operation 517. When an error-free setting response signal is received, the setting unit 422 may transfer information extracted from the setting response signal to the setting application unit 421. The setting unit 422 may interpret information extracted from the setting response signal. When the extracted information does not match the characteristic of the device and the type of the service, the setting unit 422 may not transfer the setting response signal to the setting application unit 421.

When the error-free setting response signal is not received during a predetermined period of time in operation 518, the setting unit 422 may retransmit the setting request signal and maintain operation 518. When the error-free setting response signal is not received even after the retransmissions, operation 516 may be performed again.

When the setting application unit 421 receives the setting response signal of the target device from the setting unit 422, operation 519 may be performed. Operation 519 is to perform an operation performed in the setting complete operation. The setting application unit 421 may verify the desired target device based on information included in the setting response signal and may complete setting of the communication target device. To complete setting of the communication target device, the setting application unit 421 may transmit, to the target device, a setting complete signal indicating that setting of the communication target device is completed in operation 519.

The setting application unit 421 may verify the target device through operation 519 and may transfer information associated with the target device to the communication unit 410, thereby enabling data transmission and reception to be performed through an actual communication link between the setting device and the target device.

After performing operation 519, setting of the setting application unit 421 may be initialized in operation 521, similar to operation 512, and may shift to a sleep state. The setting application unit 421 may inform the setting unit 422 that the setting application unit 421 will shift to a sleep state in operation 520 and thereby enable the setting unit 422 to shift to a sleep state in operation 522.

FIG. 6 is a diagram illustrating a procedure for setting communication target device performed in a target device according to an embodiment of the present invention.

Hereinafter, an apparatus and method for setting a communication target device performed in a target device will be further described with reference to FIG. 6.

Operations 611, 612, and 613 of FIG. 6 may be identical to operations 511, 512, and 513 of the setting device described in of FIG. 5. Here, it is assumed in FIG. 6 that the setting unit 422 receives a transmitted setting request signal from a setting device in operation 614. Here, a case in which the setting request signal is received is described above and thus, a further detailed description will be omitted here.

As described above, the setting unit 422 may transfer, to the setting application unit 421, a result of receiving the transmitted setting request signal from the setting device. To respond to the setting request signal, the setting application unit 421 may request the setting unit 422 to transmit a setting response signal in operation 615.

In operation 616, the setting unit 422 may transmit the setting response signal to the setting device.

Here, in the case of using a setting complete signal, the setting unit 422 may wait for the setting complete signal during a predetermined period of time. When the setting complete signal transmitted from the setting device is received in operation 617, the setting unit 422 may transfer the result thereof to the setting application unit 421 in operation 618. The setting application unit 421 that has received the setting complete signal from the setting unit 422 may transfer the obtained information associated with the setting device to the communication unit 410 for actual communication, thereby enabling data transmission and reception to be performed through an actual communication link.

In the case of using the setting complete signal, when the setting unit 422 does not receive the setting complete signal, the setting response signal may be retransmitted. When the setting unit 422 does not receive the setting complete signal even after retransmitting the setting response signal a predetermined number of times, the setting unit 422 may inform the setting application unit 121 that the setting has failed.

In the case of not using the setting complete signal, the setting unit 422 may shift to a sleep state after a predetermined period of time is elapsed in operation 620. Also, the setting unit 422 may shift to the sleep state in operation 620 by a command to shift to the sleep state from the setting application unit 421 in operation 619.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

According to embodiments of the present invention, in the case of setting a communication target device in a wireless communication system, a device desiring to set the communication target device may obtain a synchronization and a characteristic of a target device and/or a characteristic of type of services to be performed by receiving a synchronization signal from the target device during a predetermined period of time, and may set the communication target device based on the obtained synchronization and the characteristics, thereby effectively setting the communication target device in the wireless communication system in which synchronization between devices is not maintained.

Also, according to embodiments of the present invention, in the case of setting a communication target device in a wireless communication system, a target device may determine a state of operation, out of a sleep state or a normal state based on a signal received at a predetermined time, thereby effectively decreasing an amount of power consumed by a target device and setting the communication target device.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of setting, by a setting device, a communication target in a wireless communication system, the method comprising:
   receiving signals including characteristics of target candidate devices only during a predetermined period of time;
   obtaining timings and characteristics of the target devices from the received signals;
   transmitting setting information to the target devices based on the timings and the characteristics of the target devices; and
   completing setting of the communication target by receiving setting response signal from the target device,
   wherein the obtaining comprises obtaining a characteristic of a communication target candidate, and the communication target candidate is classified based on the characteristics of the target device and characteristics of a service provided by the target device.

2. The method of claim 1, wherein the obtaining comprises obtaining the synchronization by receiving a signal transmitted from the target device during at least one cycle.

3. The method of claim 1, wherein the obtaining comprises obtaining the characteristic of the target device by using only the synchronization signals that are allocated to the characteristic of the target device or a characteristic of a service provided from the target device.

4. The method of claim 1, wherein the transmitting comprises:
   determining whether a setting request signal is transmitted based on the obtained characteristic of the target device; and transmitting the setting request signal to reach the target device at the time of the reception section of a sleep state.

5. The method of claim 4, wherein the transmitting of the setting request signal comprises transmitting only an indicator indicating whether the setting request signal is transmitted or transmitting the indicator and setting request message following the indicator at the time of the reception section of a sleep state in the target device.

6. The method of claim 5, wherein:
when the setting request message to be transmitted is present, the indicator has an "A" signal; and
when the setting request message to be transmitted is absent, the indicator has a "-A" signal or '0' signal.

7. The method of claim 6, wherein when the obtained characteristic of the target device or a service characteristic does not match a service characteristic desired to be set as the communication target by the setting device, the setting request message is not transmitted, regardless of the transmission of the indicator.

8. The method of claim 5, wherein:
when the synchronization is obtained, the indicator has a "-A" signal; and
when the synchronization is not obtained, the indicator has a "-A" signal or '0' signal.

9. The method of claim 5, wherein the indicator is selected from signals having orthogonality and varies based on the detected synchronization signal or the setting request signal message.

10. The method of claim 1, wherein the completing comprises transmitting, to the target device, a setting complete signal indicating that setting of the communication target is completed.

11. A method of establishing, by a target device, communication between a communication target to a setting device in a wireless communication system, the method comprising:
performing a transmission operation, a reception operation, and a sleep operation at predetermined intervals; and
transmitting information associated with the target device to a setting device desiring to set the communication target,
wherein the communication target is classified based on characteristics of the target device and characteristics of a service provided by the target device,
wherein the performing comprises
transmitting a synchronization signal required when the setting device obtains a synchronization and a characteristic of the target device in the transmission operation, and
receiving a setting request signal transmitted from the setting device in the reception operation.

12. The method of claim 11, wherein a section for the transmission operation and a section for the reception operation are configured to be adjacent to each other regardless of an order.

13. The method of claim 11, wherein the synchronization signal has a different form based on the characteristic of the target device or a characteristic of a service provided by the target device.

14. The method of claim 11, wherein:
when setting request message is declared to be not transmitted, when an error occurs in a setting request signal, or when an error-free setting request signal is received and the setting request message is unsuitable for a characteristic of the target device, the performing is repeatedly performed, and
when the error-free setting request signal is received and the setting request message is suitable for the characteristic of the target device and the service characteristic, the transmitting is performed.

15. The method of claim 11, wherein the transmitting comprises receiving, by the target device, a setting complete signal and returning to the performing when the target device receives the setting complete signal correctly.

16. The method of claim 11, wherein the transmitting comprises transmitting, by the target device, a setting response signal and returning to the performing after a predetermined period of time is elapsed when the target device does not receive the setting complete signal correctly.

17. An apparatus for establishing, by a setting device, communication between a communication target to a setting device in a wireless communication system, the apparatus comprising:
a setting application unit to transmit a communication target setting command and to transfer a communication target setting result to a node at outside of the wireless communication system; and
a setting unit to discover a target device based on the timings and the characteristics of the target device and set the communication target device as the communication target using the command received from the setting application unit, to set the target device, and to transfer the communication target setting result to the setting application unit,
wherein the communication target is classified based on characteristics of the target device and characteristics of a service provided by the target device.

18. An apparatus for establishing, by a target device, communication between a communication target with a setting device in a wireless communication system, the apparatus comprising:
a setting application unit to receive a setting request message reception result from a setting device, and to transfer a communication target setting result to a node at outside of the wireless communication system; and
a setting unit to receive a setting request message from a setting device, to transfer a setting request message reception result to the setting application unit, and to transmit the setting response signal received from the setting application unit, to the setting device,
wherein the communication target is classified based on characteristics of the target device and characteristics of a service provided by the target device.

* * * * *